US007939044B2

(12) United States Patent
Mukasyan et al.

(10) Patent No.: US 7,939,044 B2
(45) Date of Patent: May 10, 2011

(54) METHOD OF MANUFACTURING SUB-MICRON SILICON-CARBIDE POWDER

(76) Inventors: Alexander Mukasyan, Granger, IN (US); Vasiliy Mukasyan, Chernogolovka (RU); Mikael Nersesyan, St. Louis, MO (US); Surên Kharatyan, Yerevan (AM); Hayk Khachatryan, Village Gexarquniq (AM)

( * ) Notice: Subject to any disclaimer, the term of this patent is extended or adjusted under 35 U.S.C. 154(b) by 563 days.

(21) Appl. No.: 12/069,386

(22) Filed: Feb. 11, 2008

(65) Prior Publication Data
US 2009/0202414 A1 Aug. 13, 2009

(51) Int. Cl.
*C01B 31/36* (2006.01)
*C04B 35/565* (2006.01)
(52) U.S. Cl. .......................... 423/345; 501/88
(58) Field of Classification Search .................. 423/345; 501/88
See application file for complete search history.

(56) References Cited

U.S. PATENT DOCUMENTS

| 4,226,841 A | 10/1980 | Komeya et al. |
| 4,676,966 A | 6/1987 | Endo et al. |
| 4,832,929 A | 5/1989 | Saiki et al. |
| 5,021,230 A * | 6/1991 | Krstic .............................. 423/345 |
| 5,436,207 A | 7/1995 | Atwell et al. |
| 5,863,325 A * | 1/1999 | Kanemoto et al. ............ 117/105 |
| 6,627,169 B1 | 9/2003 | Itoh et al. |
| 6,632,761 B1 | 10/2003 | Ushita et al. |
| 6,730,283 B2 | 5/2004 | Konno et al. |
| 7,029,643 B2 | 4/2006 | Otsuki et al. |
| 7,109,138 B2 | 9/2006 | Bandyopadhyay et al. |

OTHER PUBLICATIONS

Tianyou et al. "Electrothermal vaporization-inductively coupled plasma-atomic emission spectrometry for the direct determination of trace amoutns of impurities in slurries of silicon carbide" 2001, Analytica Chimica Acta, 433, 255-262.*

* cited by examiner

*Primary Examiner* — Wayne Langel
*Assistant Examiner* — Syed Iqbal

(57) ABSTRACT

A method of manufacturing a silicon carbide powder with submicron size of powder particles wherein a homogeneous reactant mixture comprising a source of silicone, a source of carbon, and polytetrafluoroethylene is locally preheated in a sealed reaction chamber filled with an inert gas under pressure of 20 atm to 30 atm to a temperature sufficient to initiate an exothermic self-propagating reaction ranges from 650K to 900K. In the aforementioned homogeneous reactant mixture, the carbon source is used in the amount from 63 wt % to 68%, the silicon source is used in the amount of from 20 wt. % to 25 wt. %%, and the activated additive is used in the amount of from 8 wt. % to 15 wt. % per 100% of the entire homogeneous reactant mixture.

2 Claims, 4 Drawing Sheets

Step 1 — Preparation of the reaction mixture (providing conditions for minimizing deviations in local concentration of components)

Step 2 — Loading of the reaction mixture into the reactor and initial local heating of the mixture for ignition of combustion

Step 3 — Propagation of the reaction under the effect of exothermic heat developed in Step 2

Step 4 — Post-reaction product treatment

Fig. 1

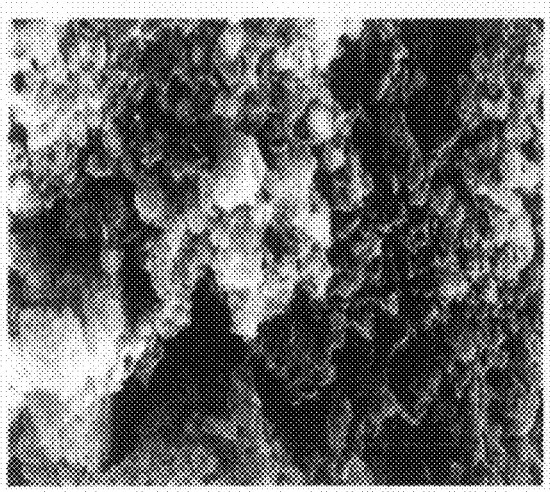
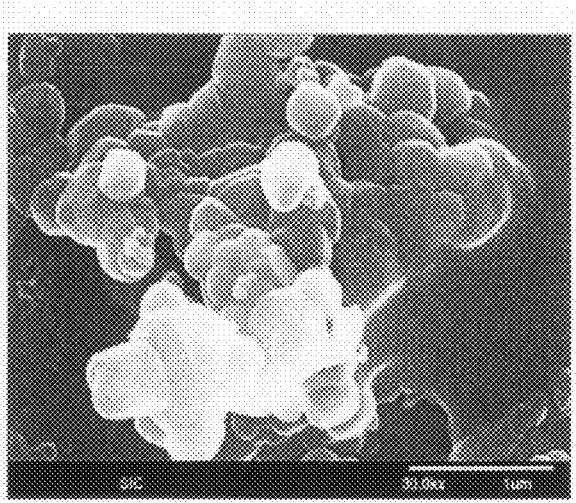
Fig. 4A
Fig. 4B

METHOD OF MANUFACTURING SUB-MICRON SILICON-CARBIDE POWDER

BACKGROUND OF THE INVENTION

1. Field of the Invention

The present invention relates to synthesis of materials using combustion in powder metallurgy and, more specifically, to a chemically activated combustion synthesis (CACS) of pure sub-micron powders of silicon carbide (SiC) used for production of abrasives, advance ceramics, composites, etc.

2. Description of the Prior Art

Silicon carbide has a unique combination of mechanical, electrical, thermal, and chemical properties, including high hardness and thermal conductivity combined with tailored electrical resistivity and outstanding corrosion resistance in certain chemical environments. These properties combined with high strength and high fracture toughness, make SiC-based ceramics an ideal material for a variety of applications, such as: abrasives; polishing plates for semiconductor wafers; advanced ceramics and composites (ceramics turbine, anti-radiation components, temperature sealing materials); ballistic armor tiles for personnel, vehicles, and aircrafts; electric and electronics products; high temperature piezoelectric sensors, resistors, semiconductors, and photonic thin films. In some applications, silicon carbide replaces metals, tungsten carbides and other ceramic materials, such as aluminum oxide.

One typical conventional method for synthesis of silicon carbide is based on a carbo-thermal reduction of silicon oxide. The reduction reaction $SiO_2+3C=SiC+2CO$ is conducted for hours in atmospheric air at temperatures about 2000° C. It is well recognized that under such conditions (i.e. high temperatures and long duration of synthesis) it is essentially impossible to produce pure silicon carbide powder with a particle size of less than 5 micron. There exist other methods for synthesis of fine SiC powders in laboratories, including plasma-chemical synthesis, microwave synthesis, reaction dispersion, chemical vapor deposition, and methods of wet chemical precipitation.

For the purpose of illustration, some methods and compositions for manufacturing silicon carbide powders known in the industry are described in the patent publications given below.

U.S. Pat. No. 4,226,841 issued in 1980 to Komeya, et al. relates to a method of producing a silicon carbide powder consisting of fine particles of uniform shape and size. The method is performed by baking a powdery mixture consisting of silica powder, carbon powder, and silicon carbide at a temperature of 1,350° C. to 1,850° C. under in a non-oxidizing atmosphere.

U.S. Pat. No. 4,676,966 issued in 1987 to Endo, et al. discloses a method for the preparation of a finely divided powder of silicon carbide as a promising material for sintered ceramic products of silicon carbide. The method comprises vapor-phase pyrolysis of a vaporizable organosilicon compound having, in a molecule, at least two, e.g. 2, 3 or 4, silicon atoms and at least one hydrogen atom directly bonded to the silicon atom but having no oxygen or halogen atom directly bonded to the silicon atom at a temperature of 750° C. or higher.

U.S. Pat. No. 4,832,929 issued in 1989 to Saiki, et al. discloses a process for producing a silicon carbide powder by reacting a gaseous silicon compound or granular silicon with a carbon compound at a high temperature. In the reaction, the amount of free carbon content in the resultant silicon carbide particles can be controlled by monitoring the amount of unsaturated hydrocarbon, such as acetylene, as a by-product. Moreover, silicon carbide particles can contain boron dispersed uniformly in the particles by a two-step process comprising first reacting a silicon source and a boron source without a carbon source in a first reaction zone to form boron-containing silicon particles, and second, reacting the resultant particles with a carbon source in a second reaction zone. Further, the above-mentioned monitoring of an unsaturated hydrocarbon by-product allows obtaining of silicon carbide particles containing no free carbon, and the silicon carbide particles containing boron in the particles.

U.S. Pat. No. 5,863,325 issued in 1999 to Kanemoto, et al. discloses a process for manufacturing high purity silicon carbide by using a high purity tetraethoxysilane or the like as the silicon source and a novolak-type phenol resin or the like as the carbon source. The process involves preparation of silicon carbide powder by calcining a mixture of the aforementioned sources in a non-oxidizing atmosphere and then post-treating the obtained silicon carbide powder at a temperature of 2000° C. for 5 to 20 minutes in order to obtain a silicon carbide powder having an average particle diameter of 10 to 500 µm and a content of impurity elements of 0.5 ppm or less. The obtained high-purity silicon carbide powder is intended for use in the manufacture of a silicon carbide single crystal having a decreased number of crystal defects.

U.S. Pat. No. 6,730,283 issued in 2004 to Konno, et al. discloses a method in which a fine β-silicon carbide powder is prepared by impregnating graphite with an organosilicon compound selected from crosslinkable silanes and siloxanes, causing the organosilicon compound to crosslink within the graphite. The powder is heated at 1,300° C. or higher in an inert gas stream for reaction. According to the authors, using only low-temperature heat treatment in air and high-temperature heat treatment in inert gas, the invention enables industrial, economical manufacture of fine silicon carbide powder in a stable manner.

U.S. Pat. No. 7,029,643 issued in 2006 to Otsuki, et al. discloses a method for manufacturing silicon carbide powder by sintering a mixture containing at least a silicon source and a carbon source, wherein a carbon source is a xylene-based resin. In preferable embodiment, the silicon source is an alkoxysilane compound. The silicon carbide powder produced by the above-mentioned method contains nitrogen in concentrations of 100 ppm or less and has volume resistivity of $1 \times 10^0$ Ω·cm or more.

U.S. Pat. No. 7,109,138 issued in 2006 to Bandyopadhyay, et al. discloses a composition for preparation of silicon carbide powder. The synergistic composition consists of a mixture of a source of pure silica such as silicon dioxide, a source of carbon such as activated charcoal, "beta" silicon carbide and a source of iron such as ferric nitrate. The cost effective synergistic composition is useful for the preparation of improved silicon carbide powder containing at least 90% SiC preferably rich in the β-phase. The silicon carbide powder of the aforementioned patent is intended for refractory and engineering applications.

U.S. Pat. No. 6,627,169 issued in 2003 to Itoh, et al. discloses a method for manufacturing a silicon carbide powder used for sintering silicon carbide body of high purity. The silicon carbide powder contains impurity elements, each of the impurity elements being contained in an amount of at most 0.01 ppm. The method includes a burning step, in which amounts of carbon monoxide generated during burning are detected and temperature adjustments are controlled in accordance with the detected amounts, and a heat treatment step, in which silicon carbide powder obtained in the burning step is heat-treated in a vacuum atmosphere; and the silicon carbide sintered body is formed by sintering silicon carbide powder.

The methods described above are based on sintering at high temperatures by consuming a large amount of external heat, which makes these processes expensive and energy-consuming. Therefore exothermic reactions for the production of silicon carbide are desirable. However, as is known to those skilled in the art, such exothermic reactions are difficult to obtain and control.

Furthermore, none of the above mentioned approaches allows effective production of sub-micron SiC powders with small amounts of impurities and with submicron size of particles. Thus, a need exists for an improved method for producing a sub-micron silicon carbide powder.

SUMMARY OF THE INVENTION

Therefore, it is an object of this invention to develop a more efficient and flexible method for production of sub-micron powders of silicon carbide of high purity. A still further object is to provide a method for synthesis a sub-micron silicon carbide powder of high purity by using exothermic heat and thus reducing the amount of external energy for the manufacturing process. Another object is to provide a mixture suitable for use as a starting material for synthesis of the aforementioned sub-micron silicon carbide powder.

The method of the invention is intended for the production of pure sub-micron SiC powder by chemically activated combustion synthesis. The method may consists of essentially the following four steps: (1) preparation of a homogeneous reactant mixture; (2) loading of the reaction mixture into the reactor and initial local heating of the powder mixture for initiation of combustion reactions; (3) propagation of the reaction under the effect of the exothermic heat developed in Step 2; and 4) post-synthesis treatment.

A schematic diagram of these steps is presented in FIG. 1. The first main step is similar to those commonly used in powder metallurgy, in which reactant powders (such as silicon, Si, carbon, C, silicon carbide, SiC, polytetrafluoroethylene (e.g., a DuPont product known under trademark Teflon®, $((C_2F_4)_n)$ may be dried under a vacuum at approximately 80-100° C., weighed into appropriate amounts of the components, and thoroughly mixed for obtaining a homogeneous reaction media, i.e., a green mixture. At this stage, it is important to minimize local fluctuations from given concentrations of the components since such deviations may influence the combustion conditions and thus the final average size of the particles and dispersion of their dimensions.

The second step consists of loading the reaction mixture prepared in Step 1 into a reaction apparatus and an initial local heating of the powder mixture for ignition of combustion. This stage can be carried out by loading the reaction mixture into a reaction tube, e.g., a carbon tube, having an inner diameter of 300 mm. The tube may then be constrained in a specially designed fixture and placed in a sealable reaction chamber which can be made, e.g., from stainless steel, or other corrosion resistant material, and have a length of 2 meter and an inner diameter of about 320 mm. The sealable reaction chamber can be lined with a graphite brick for protecting the reactor walls from interaction with the reagents and can be provided with a water cooling jacket. The reaction chamber is further provided with an igniter device, e.g., in the form of a tungsten wire, for local preheating and initiation of the reaction. Prior to initial local heating, the reaction chamber is sealed, evacuated, and purged with inert gas for several times and then filled with inert gas to a desired pressure.

After the powder is locally heated by the igniter, the power is turned off, and the reaction propagates through the reaction mixture under the effect of the exothermic heat developed after initiation of the reaction (Step 3). To initiate this main reaction, in the system of the present invention a mixture volume of only 1 mm$^3$ can be preheated locally to the temperature equal to decomposition temperature of the activated additive. In the method of the invention, a suitable combustion synthesis generates two heat-propagation fronts. Initiation of the first front results from the reaction between activated additives and silicon and provides initial heat needed for the reaction system and for converting some amount of silicon to a gas phase. The second heat front is generated as a result of a reaction between silicon (solid and liquid) and carbon, forming a silicon carbide powder.

The fourth step, i.e. post-synthesis treatment, is optional, since not all products require additional processing after synthesis. The post-synthesis treatment may comprise classification of the obtained silicone-carbide powder particles by particle size.

An aspect of the present invention is that addition of a small amount of specific chemically active substance allows one achieving a sub-micron pure SiC powders in the so-called CACS regime, which does not require preheating of the green mixture. Experiments show that amount of these additives depends on the green mixture composition (Si to C ratio) and should be in the range 0.05-0.1 mole. Smaller amount of active additives does not provide enough additional energy for self-propagation of the reaction. On the other hand, the use of larger amount of additives leads to an extremely high combustion temperature that results in dissociation of the reaction products and produces a large amount of free carbon in the final powder.

BRIEF DESCRIPTION OF THE DRAWINGS

FIG. 1 is a flow chart of a process of the invention for manufacturing a submicron silicon carbide powder.

FIGS. 4A and 4B are microphotographs that illustrate the structure of the obtained SiC powder.

DETAILED DESCRIPTION OF THE PREFERRED EMBODIMENT

Figure 2:
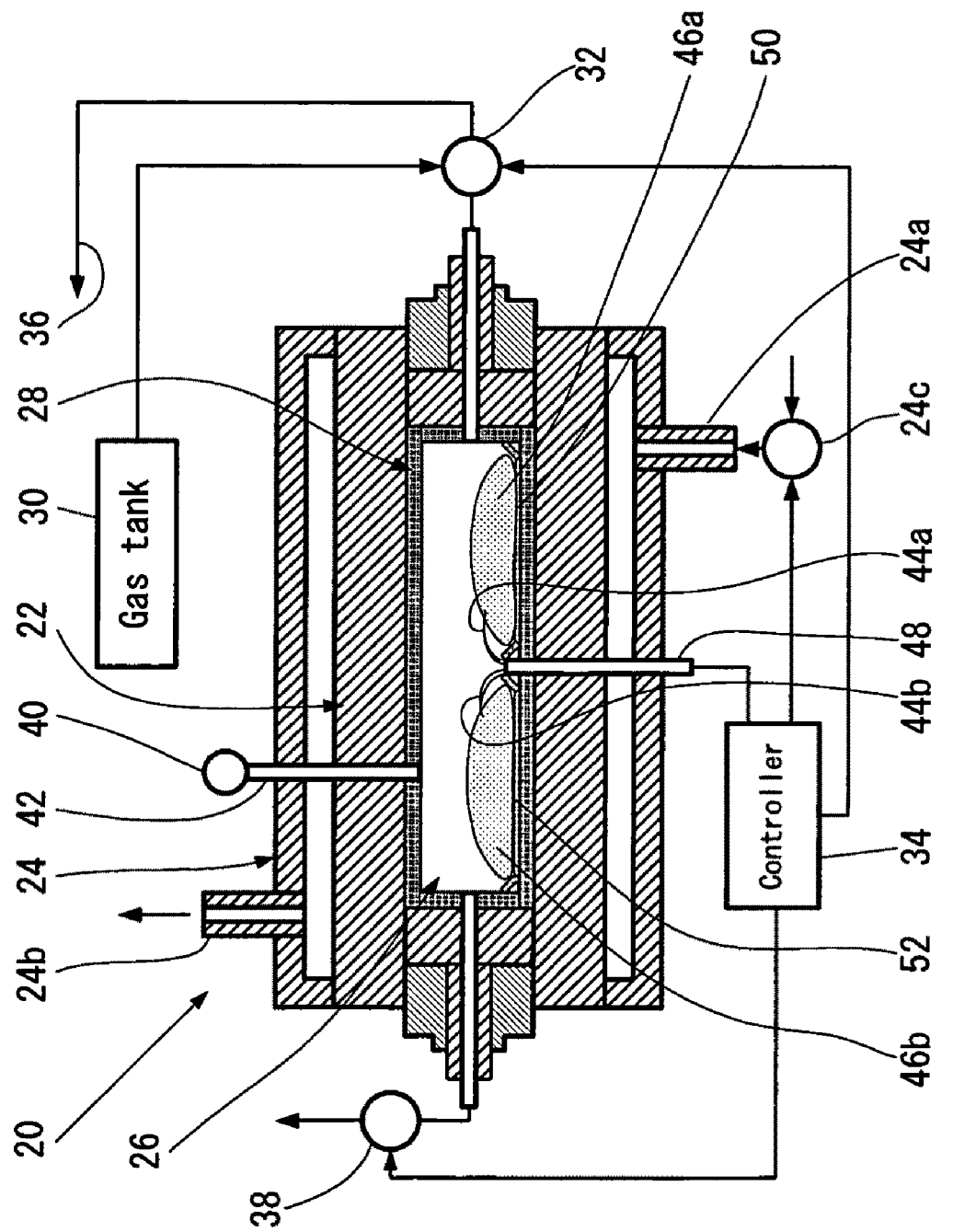
FIG. 2 is a schematic longitudinal sectional view of the apparatus suitable for realization of the method of the invention, the green mixture being shown in the form of bulk material.

Prior to describing the invention, it is advantageous to define some terms used below.

For the purposes of the present invention, the term "chemically activated combustion synthesis" refers to a combustion synthesis process using special chemical additives which activate the low-temperature exothermic reaction between silicon and carbon.

For the purposes of the present invention, the term "sub-micron powder" refers to a powder with particle size less than 1 micron.

For the purposes of the present invention, the term "green mixture" refers to an initial mixture of the reactant powders.

For the purposes of the present invention, the term "inert gas" refers to noble gases such as helium, neon, argon, krypton, xenon, as well as any gas that is non-reactive, under the conditions, in which the method of the present invention is practiced, with the materials that are reacted with each other to form a particular compound of the present invention.

For the purposes of the present invention, the term "ambient gas pressure" refers to the initial pressure of a gas contained in a reaction chamber around a reaction-media sample.

For the purposes of the present invention, the term "reaction initiated locally" refers to the initiation of a reaction in a discrete location (approximately a volume of 1 mm$^3$) on or within a sample, such that the reaction is then self-propagating and self-sustainable within, on and along the sample.

The method, referred to herein as chemically activated combustion synthesis ("CACS"), makes it possible, as explained in more detail below, to effectively obtain a pure sub-micron powder of silicon carbide in a single step. Using the rapid screening ability of this technique, synthesized novel materials with unique microstructures and enhanced properties may be produced.

More specifically, the method of the invention is intended for the production of pure sub-micron SiC powder cast alloys by chemically activated combustion synthesis. The method consists of three main steps: (1) preparation of a green mixture; (2) high temperature synthesis; and (3) post-synthesis treatment.

A schematic diagram of these steps is presented in FIG. 1. The first step is similar to those commonly used in powder metallurgy, in which reactant powders, for example, silicon (SI), carbon (C), silicon carbide (SiC), and polytetrafluoroethylene (e.g., a DuPont product known under trademark Teflon®, (($C_2F_4$)$_n$) are used. Prior to mixing, the components are dried under vacuum at approximately 80-100° C. and then dosed by weighing to appropriate amounts. For example, according to the invention, in order to produce 1 kg of the final silicone carbide powder, one needs approximately 735-770 g, preferably about 752.5 g of Si, approximately 240-270 g, preferably about 255 g of C; approximately 97-194 g, preferably about 120 g, of activated additive such as the aforementioned polytetrafluoroethylene. This stage also includes thorough mixing of the components for obtaining a homogeneous reactant mixture, which is known as a green mixture. At this stage, it is important to minimize local fluctuations from given concentrations of the components since such deviations may influence the final average size of the particles and dispersion of their dimensions. Mixing can be carried out by using standard mixing equipment such as a Ross mixer, a Bunbury mixer, a Hobart mixer, a homogenizing mixer, a ball mixer, a roller mixer, a ball mill, etc. In other words, the mixing equipment must ensure obtaining a mixture of high degree of homogeneity.

The second step is high temperature synthesis that involves several operations. The green mixture is loaded into the sealable reaction chamber of the apparatus for chemically activating combustion synthesis of silicon carbide. This can be carried out with the use of an apparatus of the type that is schematically shown in FIG. 2 which is a longitudinal sectional view. The apparatus as a whole is designated by reference numeral 20 and consists of a housing 22 surrounded by a water-cooling jacket 24 for cooling the apparatus during the reaction and for cooling the product upon completion of the reaction. In FIG. 2, reference numeral 24a designates a cooling water inlet pipe which is connected to a water-supply source (not shown) through a valve 24c controlled by a controller 34.

The housing can be made from a stainless steel or a similar chemically resistant material. The sealable reaction chamber 26 may have a round cross section and may have a length of about 2 m and a diameter of about 320 mm. The inner walls of the reaction chamber 26 are lined up with a refractory material such as a graphite brick lining 28. The reaction chamber is connected to a gas pressure source 30 (e.g., a gas tank) through a valve 32 controlled by the controller 34. The pipeline 36 is intended for evacuation of gas from the reaction chamber through the valve 32. The waste gas is removed from the reaction chamber through a valve 38 that also is controlled by the controller 34. If necessary, the same valve 38 can be used for decrease of pressure in the reaction chamber 26.

Since the reaction is carried out under a high pressure of up to 30 atm, the apparatus is equipped with a manometer 40 which is connected with the interior of the reaction chamber via a feed-through pipe 42 for controlling pressure in the reaction chamber 26.

Since initiation of the reaction requires only localized heating of a small volume of the homogeneous reactant mixture (about 1 mm$^3$), the apparatus does not have an external general heater for heating the entire volume of the reaction chamber 26 and rather is provided with at least one igniter in the form of a tungsten wire or wires 44a and 44b that can be inserted into the portions 46a and 46b of the bulk green powder mass. Reference numeral 48 designates an electrical feed-through for guiding the lead wires to the tungsten-wire igniters 44a and 44b. It should be noted that since the apparatus works under high pressure and high temperature, all feed-throughs and input/output pipelines of the reaction chamber 26 should be reliably sealed. The working chamber 26 may be equipped with mixture holders 50 and 52 for supporting the homogeneous reactant mixture in the working chamber 26. The mixture holders 50 and 52 are made from heat-resistant material such a molybdenum or the like.

The dried homogeneous reactant mixture may have the following composition: silicon, carbon, silicon carbide, and polytetrafluoroethylene (e.g., a DuPont product known under trademark Teflon®, ($C_2F_4$)$_n$). In order to produce 1 kg of the initial mixture, one needs approximately 63-68 wt. %, preferably about 65% of silicon, approximately 20-25%, preferably about 22.5% of carbon; approximately 8-15%, preferably about 10%, of activated additive such as polytetrafluoroethylene. For obtaining a large amount of the final product, the content of the components is proportionally increased.

Prior to initiation of the reaction, the reaction chamber 26 (FIG. 2) is filled with an appropriate amount of the aforementioned homogeneous reactant mixture. The tungsten wires 44a and 44b are positioned about 5 mm inside the reaction mixture portions 50 and 52. The chamber is then sealed, evacuated, and purged with inert gas, e.g., argon, for approximately three cycles and then filled with working inert gas to a desired pressure. According to a preferred embodiment of the present invention, a reaction chamber may be evacuated to a pressure of between about 0.0001 atm to about 0.05 atm, preferably to about 0.001 atm. The chamber may then be filled with an inert gas, such as, for example, argon, to a pressure of between about 20 atm to about 30 atm, preferably to about 25 atm.

Following this, the small initial volume (about 1 mm$^3$) of the homogeneous reactant mixture is heated by means of the tungsten-wire ignitors 44a and 44b until the reaction is initiated locally, followed by turning the power off, while the reaction front propagates along the mixture portions 50 and 52.

Initial heating may be conducted until local preheating of reaction media reaches a decomposition temperature of the activated additive, which is 650K to 900K for the polyfluorotetraethylene.

After preheating, the tungsten-wire ignitors 44a and 44b may be immediately turned off, to allow the reaction front to propagate along the reaction media. The duration of preheating is generally relatively short, such as approximately 1-10 seconds, preferably approximately 5 seconds.

In particular embodiments of the present invention, a suitable combustion synthesis regime involves propagation of two reaction fronts. First is owing to reaction between the activated additives and silicon, providing initial heat for the system and converting some amount of silicon to a gas phase. The second reaction front propagates owing to the reaction between silicon (solid or liquid) and carbon, forming a silicon carbide powder.

The reaction proceeds according to the following scheme:

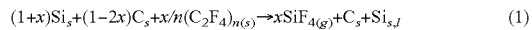

$$(1+x)Si_s + (1-2x)C_s + x/n(C_2F_4)_{n(s)} \rightarrow xSiF_{4(g)} + C_s + Si_{s,l} \quad (1)$$

$$Si_{s,l} + C_s \rightarrow SiC_s \quad (2)$$

where "s", "l", "g" indices stand for solid, liquid, and gas states respectively;
"x" is the number of moles of silicon above stoichiometry used in the initial mixture; and
"n" is the number of $C_2F_4$ molecules in polyfluorotetraethylene.

In specific embodiments of the present invention, the ambient inert gas pressure (P) may be approximately in the following range: 20<P<30 atm. Optimal pressure depends on several factors, including the amount of activated additives.

mixture of silicon and carbon powders confirmed the above conclusions. The initial preheating of the whole reaction media to 900K led not only to the use of large amount of external power and increased the process duration but also resulted in formation of relatively large 10-15 micron SiC particles.

In contract to the above, addition of a small amount of chemically active substance suggested by the present invention made it possible to obtain a pure sub-micron SiC powder in the so-called CACS regime, which does not require preheating of the entire homogeneous reactant mixture. The inventor herein has found that for the specific process of the present invention such a chemically active substance is polytetrafluoroethylene (PTFE) (e.g., a DuPont product known under trademark Teflon®, $((C_2F_4)_n)$. Experiments showed that the amount of these additives depends on the green mixture composition mole ratio of Si to C and should be in the range 0.05 to 0.1. Smaller amount of active additives does not provide additional energy sufficient for initiation of the reaction and for self-propagation of the ignited reaction. On the other hand, the use of a larger amount of additives leads to extremely high combustion temperature that may result in dissociation of the reaction products and thus emission of a large amount of free carbon in the final powder. Table 1 provides experimental data which demonstrate the above conclusions for the following conditions (Si:C ratio: 1:0.85; argon pressure: 25 atm).

TABLE 1

| Amount of PFTE in green mixture, mol. | Initial temperature K | Combustion Temperature, K | Amount of SiC in final product, wt. % | Amount if free C or Si in final product, wt. % | Average particle size ☐m |
|---|---|---|---|---|---|
| 0 | 300 | N/A (reaction does not proceed) | N/A | | N/A |
| 0 | 900 | 2330 | 99.9 | 0.1 | 12 |
| 0.02 | 300 | N/A (reaction does not proceed) | N/A | | N/A |
| 0.01 | 300 | 2250 | 95 | 5 (Si) | 1 |
| 0.04 | 300 | 2350 | 99.3 | 0.7 (Si) | 0.9 |
| 0.05 | 300 | 2500 | 99.8 | 0.2 | 0.6 |
| 0.1 | 300 | 2770 | 93 | 1.7 (C) | 0.5 |

Too low pressure leads to the formation of undesired excess of gaseous-phase products, while higher pressure provides more effective use of the materials.

In particular embodiments of the present invention, when the first reaction front reaches the end of the reaction media, a reaction chamber may be evacuated to a pressure of from about 0.0001 atm to about 0.05 atm, preferably to about 0.001 atm, and again filled with inert gas such as, for example, argon, to a pressure from between about 1 atm to about 10 atm, preferably to about 5 atm.

The step of post-synthesis treatment is optional since not all products require additional processing after synthesis. Classification of the synthesized powders may be used to obtain products with narrow particle size distribution.

Figure 3:
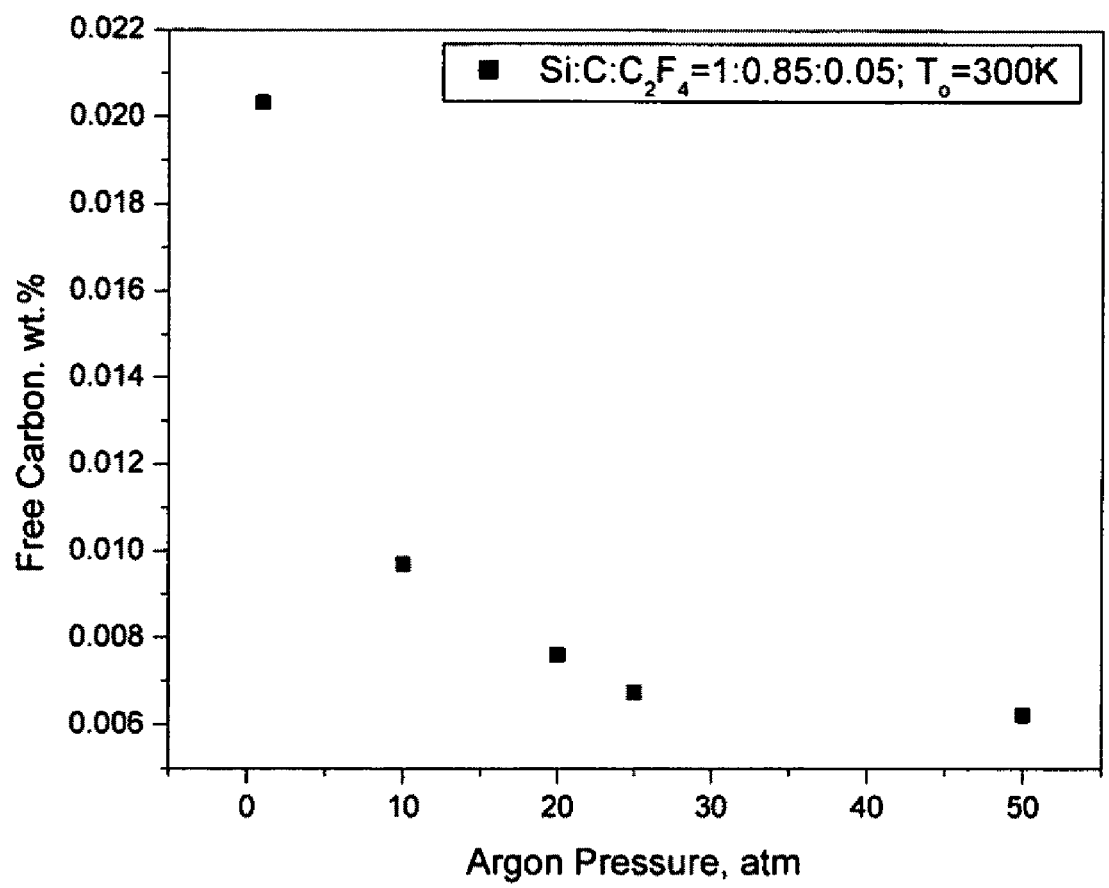
FIG. 3 is a graph that represents the experimental data which illustrate selection of the optimum range (20-30 atm) of gas pressure in the reactor.

Thermodynamic calculations for a conventional silicon-carbon system shows that the adiabatic reaction temperature (maximum temperature, which can be reached in the combustion process) is relatively low, i.e. 1878K, which is not enough for self-propagation of the reaction. Initial preheating of the whole volume of the homogeneous reactant mixture up to about 900K is required for reaction to occur in self sustained mode. Experiments conducted with a 1:1 conventional Another aspect of the present invention is that before initiation of CACS the reaction chamber may be evacuated to a pressure of between about 0.0001 atm and about 0.05 atm, preferably about 0.001 atm. The chamber then should be filled with an inert gas, such as, for example, argon, to a pressure of between about 20 atm and about 30 atm, preferably about 25 atm. Indeed it was experimentally shown that too low pressure leads to the formation of undesired excess of gas phase products and as a result to large amount of free carbon in the final powder. On the other hand, higher pressure does not lead to significant increase of powder properties. FIG. 3 represents experimental data which illustrate that the 20-30 atm range of gas pressure is optimal for the reaction.

A characteristic microstructure of as-synthesized (without additional milling) SiC powder is shown in FIGS. 4A and 4B. The sub-micron (average size 300 nm) particles have narrow size distribution. Analysis of specific surface area (BET) of the powder gives the value of 9 $m^2/g$ In addition, chemical analysis reveals less than 0.2 wt. % of carbon, less than 0.1 wt. % of Si in the final product, and total oxide of less than 0.5 wt. %.

Thus, it has been shown that the invention provides an efficient and flexible method for production of sub-micron powders of silicon carbide of high purity. The invention provides a method for synthesis a sub-micron silicon carbide powder of high purity by using exothermic heat and thus reducing the amount of external energy for the manufacturing process. The invention also provides a mixture suitable for use as a starting material for synthesis of the aforementioned sub-micron silicon carbide powder.

Although the invention has been shown and described with reference to specific embodiments, it is understood that these embodiments should not be construed as limiting the areas of application of the invention and that any changes and modifications are possible, provided these changes and modifications do not depart from the scope of the attached patent claims. For example, ignitors other than the tungsten wire, e.g., laser type igniter can be used for initiation of the localized reaction. Inert gas other than argon can be used as a working inert gas in which synthesis of the SiC powder can be carried out. The apparatus may have a structure different from one shown in the drawings.

The invention claimed is:

1. A method of manufacturing a silicon carbide powder with submicron size of powder particles comprising:

preparing a homogeneous reactant mixture comprising at least a carbon source, silicon source, and an activated additive for initiating an exothermic self-propagating reaction in the aforementioned homogeneous reactant mixture when this mixture is locally preheated to a temperature sufficient to initiate the aforementioned exothermic self-propagating reaction;

loading the homogeneous reactant mixture into a sealable reaction chamber;

locally preheating the aforementioned homogeneous reactant mixture in a predetermined local volume thereof to the aforementioned temperature sufficient to initiate the aforementioned exothermic self-propagating reaction; and obtaining a silicon carbide powder with submicron size of powder particles by maintaining the exothermic reaction that propagates through the entire homogeneous reactant mixture in the atmosphere of an inert gas and under a predetermined pressure, wherein the aforementioned exothermic self-propagating reaction propagates heat through the homogeneous reactant mixture first due to a reaction between the activated additive and the source of silicon thus providing initial heat and then forming the silicon carbide powder with submicron size of powder particles due to a reaction between the source of silicon and carbon.

2. The method of claim 1, wherein the exothermic self-propagating reaction proceeds according to the following scheme:

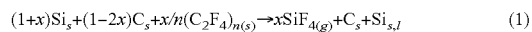  (1)

  (2)

where "s", "l", "g" indices stand for solid, liquid, and gas states, respectively; "x" is the number of moles of silicon above stoichiometry used in the initial mixture; and "n" is the number of $C_2F_4$ molecules in polyfluorotetraethylene.

* * * * *